Feb. 20, 1968  E. E. ENGLER  3,370,161
THERMOMETER CARRYING CASE AND ILLUMINATING DEVICE
Filed Oct. 21, 1966  2 Sheets-Sheet 1

INVENTOR
ELLIOTT E. ENGLER
BY
Hammond and Littell
ATTORNEYS

Feb. 20, 1968 E. E. ENGLER 3,370,161
THERMOMETER CARRYING CASE AND ILLUMINATING DEVICE
Filed Oct. 21, 1966 2 Sheets-Sheet 2

INVENTOR
ELLIOTT E. ENGLER
BY
Hammond and Littell
ATTORNEYS

United States Patent Office 3,370,161
Patented Feb. 20, 1968

3,370,161
THERMOMETER CARRYING CASE AND
ILLUMINATING DEVICE
Elliott E. Engler, 4 Maple Grove Ave.,
Westport, Conn. 06880
Filed Oct. 21, 1966, Ser. No. 588,544
5 Claims. (Cl. 240—6.46)

ABSTRACT OF THE DISCLOSURE

A novel device to provide illumination for reading a thermometer and to act as a carrying case for the thermometer when not in use which comprises a body whose upper surface is provided with a recess adapted to accommodate a medical thermometer, a moveable cover on the said body to close over the upper surface to retain the thermometer in the recess, the bottom of the said recess being transparent over at least a portion of the recess, a moveable light source positioned beneath the recess, a source of electrical energy in the said body connected to the light source and switch means for interrupting the electrical circuit.

Prior art

Thermometers used for taking temperatures of humans and warm-blooded animals are relatively small and have calibrations which are positioned very close to one another which make it difficult to read the temperatures except under excellent light conditions. Since a person's temperature is often taken at night or in a dark room, the thermometer cannot always be immediately read. Even in good light, it is often difficult to read thermometers accurately.

Objects of the invention

It is an object of the invention to provide a compact, simply constructed device for providing illumination for reading a thermometer.

It is another object of the invention to provide a device for illuminating a thermometer which also acts as a carrying case for the thermometer.

These and other objects and advantages of the invention will become obvious from the following detailed description.

The invention

The novel illuminating device of the invention for medical thermometers is comprised of a body whose upper surface is provided with a recess adapted to accommodate a medical thermometer, a moveable cover on the said body to close over the upper surface to retain the thermometer in the recess, the bottom of the said recess being transparent over at least a portion of the recess, a moveable light source positioned beneath the recess, a source of electrical energy in the said body connected to the light source and switch means for interrupting the electrical circuit.

The illuminating device of the invention has the advantage that it acts as a compact carrying case for the thermometer when not in use and provides a self-contained, concentrated beam of light so that a thermometer can be read at any time without disturbing the patient. After taking a person's temperature, the thermometer is placed in the recess in the body and the light is switched on. The light is moveable so that the light can be placed directly under the portion of the thermometer that is to be read.

The body of the illuminating device is preferably rectangular in order to make the device as compact as possible while still accommodating a medical thermometer which is long and slender. The cover is preferably hinged on the long side and is provided with a clasp or other locking means to keep it securely closed when being carried.

The recess of the body which is adapted to accommodate the thermometer is preferably widened at one point to accommodate a person's fingers so the thermometer may be easily grasped for removal. The bottom of the recess is transparent over at least that portion of the recess in which the calibrated portion of the thermometer will lie when accommodated therein so that the light source may be positioned directly below the portion of the thermometer to be read. The transparent portion of the recess may be made of any suitable material such as glass or plastic and the transparent portion is preferably tinted, such as red or yellow, to avoid a harsh glare of light which might make reading of the thermometer difficult. The ends of the recess may be padded to prevent the thermometer from breaking when being inserted into or removed from the recess or while being carried.

The source of electrical energy may be batteries of any desired size but it is preferable to use two pen light batteries which are compact and provide energy to operate the light bulb. The body of the illuminating device may be provided with a screw slightly larger than the batteries and spring connecting the battery chamber with the outside of the device so that the batteries may be easily replaced.

The switch means for interrupting the electrical circuit may be any suitable switch. One switch means which may be used is a push button switch set in a recess of the upper surface of the body. The closing of the lid will not actuate the switch since it is recessed but the button may easily depressed when desired. Another switch means which may be used is a push button switch in the upper surface of the body which interrupts the electrical circuit when depressed and completes the circuit when released. This switch means has the advantage that the light is switched off when the cover is closed and is turned on automatically when the cover is opened for use.

The base of the body of the illuminating device is preferably removable so that repairs of placement of the light bulb can be easily made. A recess may be provided in the interior of the body to accommodate an extra light bulb in the event that the light bulb burns out.

To avoid contamination of the illuminating device by the thermometer after its use, the thermometer may be placed in a small plastic envelope adapted to the shape of the thermometer or the upper surface and the cover may be lined with a folded piece of plastic molded to the contours of the upper surface and cover and provided with a hole for the push button switch. If desired, the bottom of the illuminating device may be provided with a drawer for storage of the said envelopes.

Referring now to the drawings.

Figure 5:
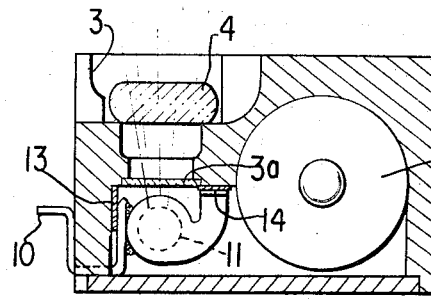
FIG. 5 is a cross-sectional view taken along line 5—5 of FIG. 2 to illustrate the illumination.
Figure 6:
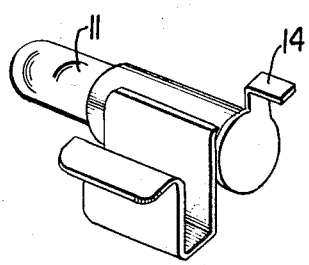
FIG. 6 is a plan view of the means for moving the light.

In the said figures, the illuminating device is comprised of a body 1 with an upper surface 2 having therein a recess 3 adapted to accommodate a medical thermometer 4 and a recess 7 in which push button 8 resides. The body 1 is provided with a cover 5 for the upper surface 2 which has a clasp 6 for locking the cover in place for transporting of the device. A portion of the recess 3 is widened at points 9 to allow easy grasping of the thermometer for removal from recess 3. Slide 10 which holds light bulb 11 can be moved along the length of the body 1 so that the light bulb can be placed beneath the calibrations of the thermometer to be read. The bottom portion of the recess 3 beneath the calibrated portion of the thermometer is comprised of a transparent plate 3a so that the light ray may pass through the thermometer as shown in FIG. 5. For sanitary reasons, thermometer 4 is placed in plastic envelope 12 after use.

Figure 1:
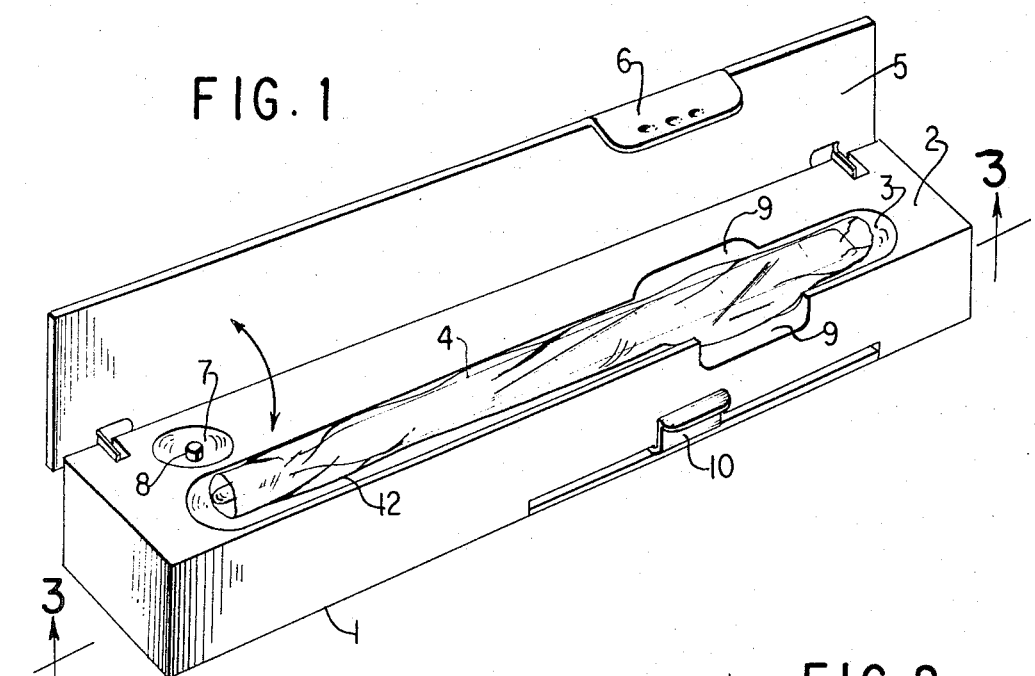
FIG. 1 is a perspective view of one illuminated device embodiment of the invention.
Figure 2:
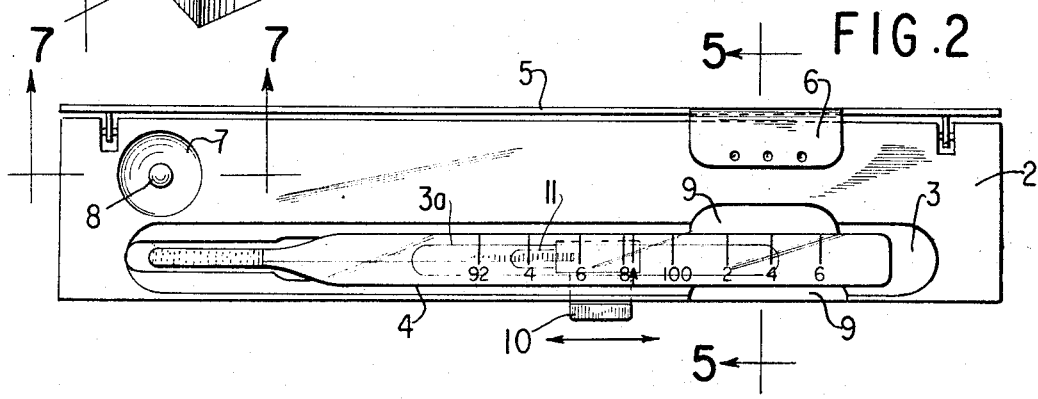
FIG. 2 is a top plan view of the embodiment of FIG. 1 with the cover open.
Figure 3:
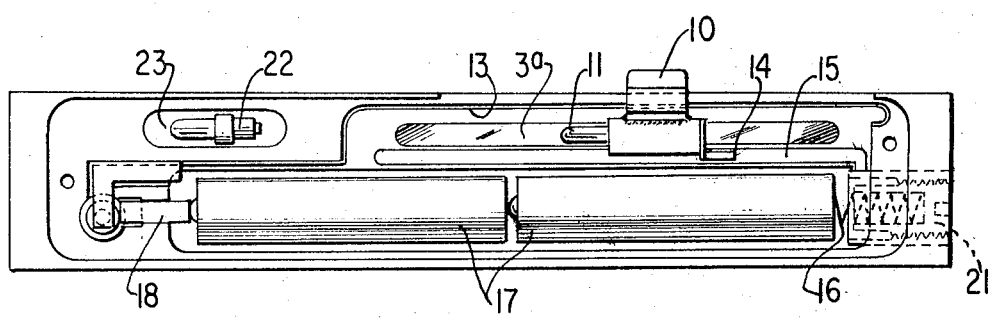
FIG. 3 is a bottom plan view of the embodiment of FIG. 1 along line 3—3 with the base plate removed.
Figure 4:
FIG. 4 is a plan view of the thermometer and its protective cover.
Figure 7:
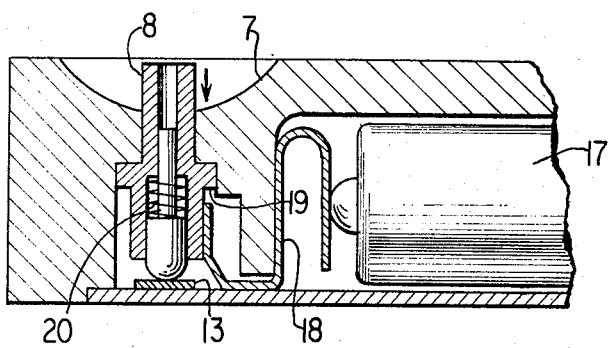
FIG. 7 is a cross-sectional view taken along line 7—7 of FIG. 2 to illustrate the switch means.
Figure 10:
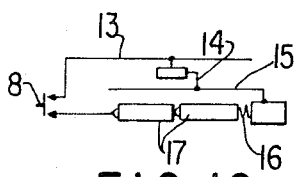
FIG. 10 is a diagram of the electrical circuit of the embodiment of FIG. 1.
Figure 8:
FIGS. 8 and 9 are plan views of the means for connecting the light and batteries, respectively, to the switch means.
Figure 9:
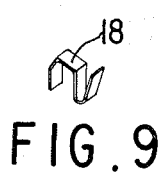

As can be seen from FIG. 3 and FIG. 10, the electrical circuit for the system goes from switch 8 through contact bar 13 to slide 10 through the bulb 11, then flange 14 to contact bar 15 to spring 16 to batteries 17 and through spring clip 18 back to switch 8. When push button switch 8 is depressed, flange 19 (see FIG. 7) comes in contact with spring clip 18 to complete the electrical circuit. When the pressure is released from the switch 8, spring 20 forces switch 8 back to its original position thereby interrupting the electrical circuit. When screw 21 is removed, the batteries 17 can be removed from the body if replacement is necessary. A spare light bulb 22 can be kept in recess 23 in the event light bulb 11 burns out.

Various modifications of the illuminating device of the invention may be made without departing from the spirit or scope thereof and it is to be understood that the invention is to be limited only as defined in the appended claims.

I claim:

1. An illuminating device for medical thermometers comprising a body whose upper surface is provided with a narrow, elongated recess adapted to accommodate a medical thermometer, a moveable cover on the said body to close over the upper surface to retain the thermometer in the recess, the bottom of the said recess being transparent over at least a portion of the recess, a light source positioned beneath the recess and moveable along the transparent portion of the recess, a source of electrical energy in the said body connected to the light source and switch means for interrupting the electrical circuit.

2. The device of claim 1 wherein the transparent portion of the recess is tinted to reduce glare.

3. The device of claim 1 wherein the recess which accommodates the thermometer is widened at one point to permit easy removal.

4. The device of claim 1 wherein the switch means is a push button switch set in a recess in the upper surface of the body.

5. The device of claim 1 having a medical thermometer in the narrow elongated surface.

References Cited

UNITED STATES PATENTS

| | | | |
|---|---|---|---|
| 2,554,854 | 5/1951 | Chomes | 240—6.4 |
| 2,677,044 | 4/1954 | Lawler | 240—6.45 |
| 2,704,804 | 3/1955 | Eames et al. | 240—6.45 |

NORTON ANSHER, *Primary Examiner.*

W. A. SIVERTSON, *Assistant Examiner.*